US008950756B2

(12) United States Patent
Lu et al.

(10) Patent No.: US 8,950,756 B2
(45) Date of Patent: Feb. 10, 2015

(54) UNIVERSAL MOUNTING HOLE MEANS FOR DIFFERENT ELECTRIC TOOL HEADS

(75) Inventors: Tao Lu, Zhejiang (CN); Xuefeng Xu, Zhejiang (CN)

(73) Assignee: Ningbo Gemay Industry Co., Ltd., Ningbo (CN)

( * ) Notice: Subject to any disclaimer, the term of this patent is extended or adjusted under 35 U.S.C. 154(b) by 561 days.

(21) Appl. No.: 13/265,204

(22) PCT Filed: Dec. 3, 2010

(86) PCT No.: PCT/CN2010/001949
§ 371 (c)(1),
(2), (4) Date: Oct. 19, 2011

(87) PCT Pub. No.: WO2012/016365
PCT Pub. Date: Feb. 9, 2012

(65) Prior Publication Data

US 2012/0169018 A1 Jul. 5, 2012

(30) Foreign Application Priority Data

Aug. 5, 2010 (CN) ...................... 2010 2 0283801 U

(51) Int. Cl.
*B23B 31/02* (2006.01)
*B25F 3/00* (2006.01)

(52) U.S. Cl.
CPC ........................................ *B25F 3/00* (2013.01)
USPC ......... 279/143; 83/698.41; 451/359; 451/357

(58) Field of Classification Search
CPC .... B27B 19/006; A61B 17/14; A61B 17/141; A61B 17/148; B23D 61/006
USPC .................... 279/141–145; 83/664, 665, 666, 83/698.41, 782; 408/239 A; 451/357, 359; 606/176, 177, 82, 178, 171; 30/339, 30/166.3, 392; D8/20, 70, 19
See application file for complete search history.

(56) References Cited

U.S. PATENT DOCUMENTS

| | | | | | |
|---|---|---|---|---|---|
| D394,315 | S | * | 5/1998 | Fisher | D24/146 |
| D405,177 | S | * | 2/1999 | Hutchins et al. | D24/146 |
| D459,805 | S | * | 7/2002 | Pascaloff | D24/146 |
| D489,823 | S | * | 5/2004 | Fisher et al. | D24/146 |
| D651,499 | S | * | 1/2012 | Tong | D8/70 |
| D682,652 | S | * | 5/2013 | McRoberts et al. | D8/70 |

(Continued)

FOREIGN PATENT DOCUMENTS

| | | | | |
|---|---|---|---|---|
| EP | 1607058 | A1 | * | 12/2005 |
| WO | PCT/CN2010/001949 | | | 5/2011 |
| WO | WO 2013067960 | A1 | * | 5/2013 |

*Primary Examiner* — Eric A Gates
*Assistant Examiner* — Paul M Janeski
(74) *Attorney, Agent, or Firm* — Wang Law Firm, Inc.; Li K. Wang; Stephen Hsu

(57) ABSTRACT

The present invention discloses a kind of universal mounting hole means for different tool heads of electric tools, which are disposed on a mounting portion of the tool head, comprising a central hole and a plurality of long and narrow limiting holes which orient radially surrounding the central hole and disposed in distance with each other. Compared with the prior art, the present invention is applicable to various kinds of structures of the mounting seat on electrical tool and is more universal. It takes much convenience to people when changing different tool heads of electric tools, and it is benefit for storing.

4 Claims, 3 Drawing Sheets

(56) References Cited

U.S. PATENT DOCUMENTS

D694,596 S * 12/2013 Davidian et al. ................. D8/20
D694,597 S * 12/2013 Davidian et al. ................. D8/20
D694,598 S * 12/2013 Davidian et al. ................. D8/20
2004/0098000 A1* 5/2004 Kleinwaechter .............. 606/167
2008/0190259 A1* 8/2008 Bohne ............................. 83/666

* cited by examiner

UNIVERSAL MOUNTING HOLE MEANS FOR DIFFERENT ELECTRIC TOOL HEADS

CROSS REFERENCE TO RELATED PATENT APPLICATION

The present application is the US national stage of PCT/CN2010/001949 filed on Dec. 3, 2010, which claims the priority of the Chinese patent application No. 201020283801.0 filed on Aug. 5, 2010, which application is incorporated herein by reference.

FIELD OF THE INVENTION

The present invention relates to the field of electric tools, especially to a kind of universal mounting hole means for different tool head of electric tools.

DESCRIPTION OF THE PRIOR ART

With the development of industrial technology, an increasing number of kinds of electric tools pour into the majority of the field of electric tools, which are used to incise, burnish, clip. These electric tools usually comprise a driving motor, a transmission assembly which is connected with the driving motor, and a tool head driven by the transmission assembly. Different tool head has its different function, for example, a zigzag saw bit such a tool head is used for incising, a tool head with milled sand is used for burnishing, and so on. In early times, electric tools with different functions are all complete set of equipments, it is not only wasting the material but also occupying much space and being inconvenient to store. People designed the tool heads to be with a dismountable structure afterwards, getting different functions by interchanging tool heads. It will save materials, be easy to store and convenient to be took along when the electric tool is used outside. However, at present, there are no established standards on mounting tool heads, every company designs and manufactures the tool head and the transmission assembly according to their own preference, so the designs owned by different companies are mostly different.

FIGS. 1~5 show several common mounting structures of tool heads. FIG. 1 shows that a much bigger screw hole 11 is disposed on the centre of a first mounting seat 1 on a transmission assembly, and several protrusions 12 are disposed equably at the surrounding of the screw hole 11 which is closed to the edge of the mounting seat 12. Accordingly, FIG. 2 shows that a screw hole 21 and multiple limiting holes 22 are disposed on the mounting seat of the tool head 2. When assembling, the screw hole 11 should be aimed at the screw hole 21, each limiting hole 22 should surround the respective protrusions 12; after the screw traverses the screw hole 21, 11, tool heads 2 will be locked on the mounting seat 1. When you want to interchange the tool heads 2, screwing out the screw firstly, mounting a tool head with required function, and repeating doing the above-mentioned operation, then the tool head can be mounted on.

The interchanged tool head should be equipped with a mounting portion which has the same structure as the mounting seat, otherwise the tool head can't to be used. For example, the second tool head showed in FIG. 3 cannot be mounted on the first tool head showed in FIG. 1. The structure of second mounting seat showed in FIG. 3 is similar with the structure of the structure of first mounting seat showed in FIG. 1, but the distance between the protrusions 32 and the screw hole 31 is different, only this one difference, the tool head in FIG. 3 cannot be fit for the mounting seat 1 in FIG. 1.

FIG. 4 shows a screw hole 41 is disposed on the centre of a third mounting seat 4, an annular protrusion 42 is disposed surround the screw hole 41, four projecting blocks 43 are disposed equably on the periphery of the annular protrusion 42. Accordingly, the mounting portion of the tool head in FIG. 5 should be corresponding equipped with an annular hole 52 and a mounting holes 51. There are other mounting structures, it will not be described here.

Changing the tool head can change the functions of electric tools, which take great convenience to the people, however the universality of a tool head with different function or manufactured by different factory is a fly in the ointment when people change the tool head.

SUMMARY OF THE INVENTION

It is an object of the present invention to provide a kind of universal mounting hole means for different electric tool heads with better universality to be applicable to various kinds of structure of mounting seat on many electrical tools.

For achieving above stated object, a universal mounting hole means for different electric tool heads comprising: a central hole and a plurality of rectangle limiting holes which orient radially surrounding the central hole and disposed in distance with each other, the central hole and small rectangle limiting holes are on a mounting portion of the different electric tool heads;

the central hole includes a central portion and a plurality of long and narrow first extending portions which extend outward from the peripheral edge of the central portion and are disposed in distance;

the limiting holes and the first extending portions are disposed in alternation with each other.

In the universal mounting hole means, the central portion of the central hole is a screw hole, which can be applicable for various kinds of screw. The first extending portions can be applicable to the annular protrusion with projecting blocks; the long and narrow limiting holes can be applicable to different protrusions in different position. Therefore, the present invention can be applicable to various kinds of structure of the mounting seat on electrical tool and be more universal.

As a preference, the number of the limiting holes is eight, the number of the first extending portions is four, and two limiting holes are disposed between the two adjacent first extending portions.

As a preference, the central hole also includes a plurality of second extending portions each of which is located between the two adjacent first extending portions and extends outward from the peripheral edge of the central portion, and each second extending portion is located between the two adjacent limiting holes.

As a preference, the outer ends of the first extending portions and the limiting holes which are far from the central portion are located on a same circumference.

Compared with the prior art, the present invention is applicable to various kinds of structures of the mounting seat on electrical tool and is more universal. It takes much convenience to people when changing different tool heads of electric tools, and it is benefit for storing.

DETAILED DESCRIPTION OF THE PREFERRED EMBODIMENT

To enable a further understanding of the innovative and technological content of the invention herein, refer to the detailed description of the invention and the accompanying drawings below:

FIGS. 6~10 show the embodiment of the present invention, in the present invention, a tool head 9 is a saw bit 91, whose mounting portion 92 is a stainless steel plate fixed with the saw bit 91.

Figure 6:
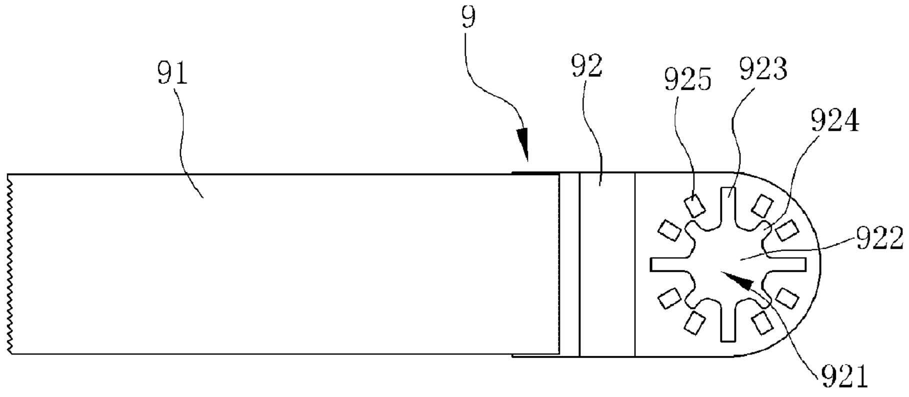
FIG. 6 is the front view of the embodiment of the universal mounting hole means for different electric tool head of the present invention.

FIG. 6 shows a universal mounting hole means for different electric tool heads, the universal mounting hole means comprises a central hole 921 and a plurality of rectangle limiting holes 925 which are both disposed on the mounting portion 92.

The central hole 921 has a centre portion 922 for screw to traverse and four long and narrow first extending channels 923 which extend outward from the peripheral edge of the central portion 922 and are disposed in distance; four second extending channels 924 are disposed between the two adjacent first extending channels 923, the second extending channels 924 extend outward from the peripheral edge of the central portion and are disposed between two adjacent first extending channels 923 in distance, and the length of second extending portions 924 is less than first extendingchannels 923.

The number of the limiting holes 925 is eight in this embodiment, and the shape is long and narrow, the limiting holes 925 surround the central hole 921, the first extending channels 923 and the limiting holes 925 which are far from the central portion 922 are respectively located on a same circumference.

Figure 1:
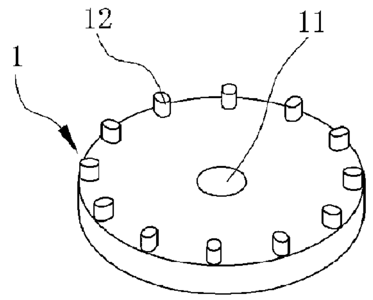
Fig. 1 (Prior Art)
FIG. 1 is the perspective view of the first kind of the mounting seat described in the Description of the Prior Art.
Figure 2:
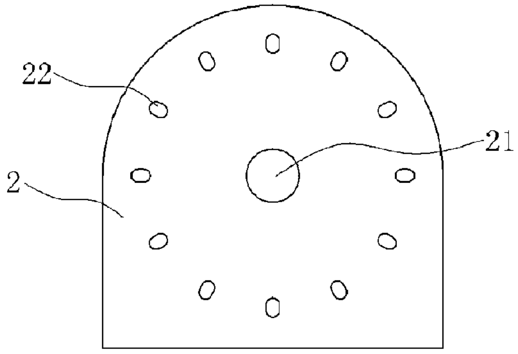
Fig. 2 (Prior Art)
FIG. 2 is the front view of the mounting holes on a tool head adapting to the first kind of the mounting seat shown in FIG. 1.
Figure 7:
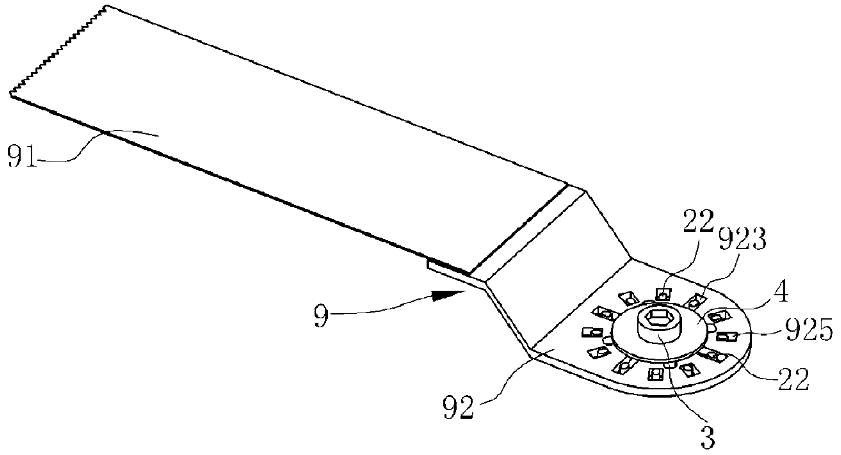
FIG. 7 is the perspective view of the embodiment equipped with the first kind of the mounting seat.
Figure 8:
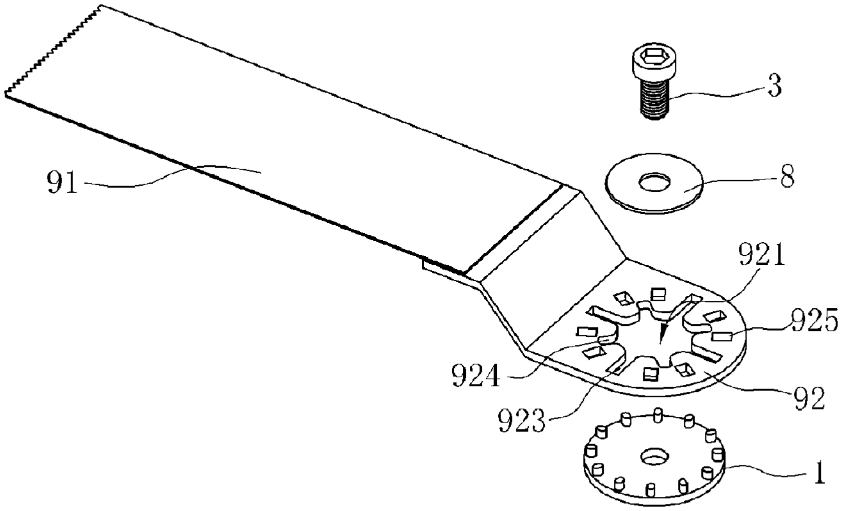
FIG. 8 is the exploded view of FIG. 7.

FIG. 7 shows that the tool head 9 is mounted on the first mounting seat 1 shown in FIG. 1. The central portion 922 of the central hole should be aimed at the screw hole 11; the limiting holes 925 should be respectively aimed at protrusions 12 and tool heads should be buttoned on the mounting seat 1, these eight protrusions are respectively located on the limiting holes 925 which are far from the central portion 922, the protrusions 12 are located in the first extending channels 923, then a gasket 8 is disposed, a screw 3 traverses the central portion 922 of the central hole and a screw hole 11, after screwing down, the tool head 9 is completely mounted.

Figure 3:
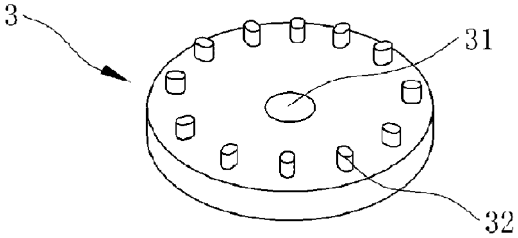
Fig. 3 (Prior Art)
FIG. 3 is the perspective 1 view of the second kind of the mounting seat described in the Description of the Prior Art.
Figure 9:
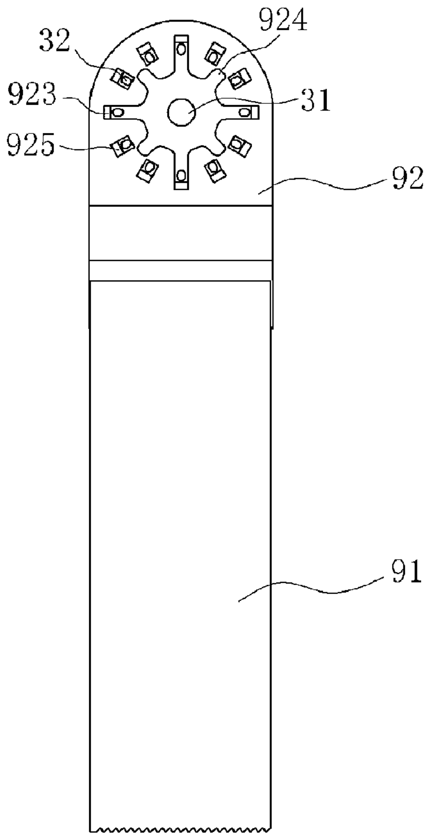
FIG. 9 is the front view of the embodiment equipped with the second kind of the mounting seat.

FIG. 9 shows that the tool head 9 is mounted on the second mounting seat 3 shown in FIG. 3, when the tool head 9 of this embodiment is buttoned to the mounting seat 3, protrusions 32 are respectively located in the limiting holes 925 which are close to the end of the central portion 422.

In this embodiment, the universal mounting hole means is also applicable to the mounting seat with four, six, or eight protrusions.

Figure 4:
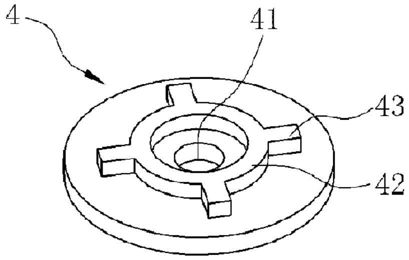
Fig. 4 (Prior Art)
FIG. 4 is the perspective view of the third kind of the mounting seat described in the Description of the Prior Art.
Figure 5:
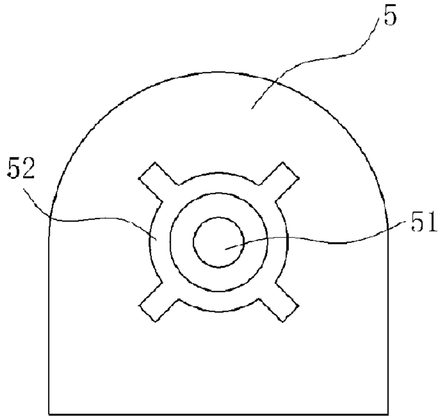
Fig. 5 (Prior Art)
FIG. 5 is the front view of the mounting holes on a tool head adapting to the first kind of the mounting seat shown in FIG. 4.
Figure 10:
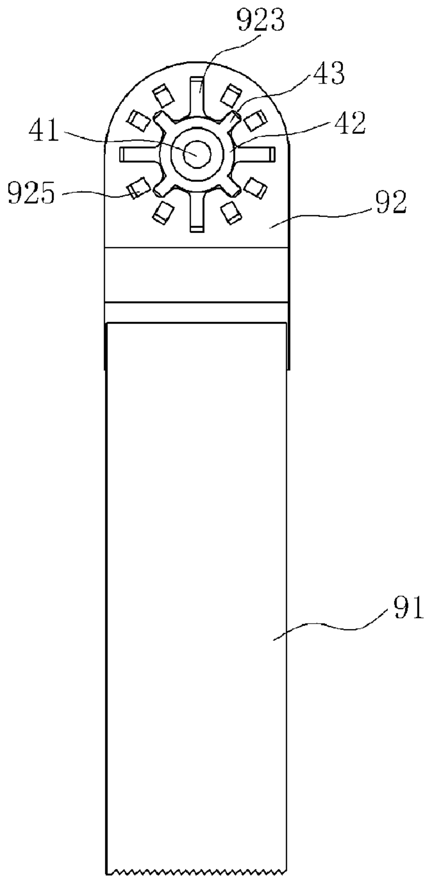
FIG. 10 is the front view of the embodiment equipped with the third kind of the mounting seat.

FIG. 4 shows a third kind of a mounting seat 4 equipped with the annular protrusion 42 around the screw holes 41, and four projecting blocks 43 disposed equably on the periphery of the annular protrusion 42. As FIG. 10 shown, the second extending channels 924 should be aimed at projecting blocks 43 and the tool head 9 should be buttoned on the mounting seat 4, at this time, the central portion 922 of the central hole is aimed at the screw hole 41, after screwing down, the tool head 9 is completely mounted on.

The universal mounting hole means for different electric tool head of this embodiment can also is be applicable to other kinds of mounting seat, such as a mounting seat with limiting protrusions disposed between the screw holes and the limiting holes, the limiting protrusions match with the second extending portions 924. In a word, the universal mounting hole means for different electric tool head of the present invention can be applicable to the mounting seat of 90% of electric tools.

What is claimed is:

1. A universal tool mounting apparatus comprising:

a mounting portion for attaching to a tool head, wherein a central hole is defined on the mounting portion, the central hole includes a central portion, a plurality of first channels extending outwardly from the central hole, a plurality of second channels extending outwardly from the central hole, and a plurality of rectangle limiting holes placed radially around the central hole and between the first plurality of first channels, there are eight limiting holes and four the first channels, and every two limiting holes are disposed between two adjacent first channels, each second channel is located between two adjacent first channels and between two adjacent limiting holes.

2. The universal tool mounting apparatus according to claim 1, wherein outer ends of the first channels and outer ends of the limiting holes are equally far away from the central portion.

3. The universal tool mounting apparatus according to claim 1, wherein outer ends of the first channels and outer ends of the limiting holes which are far from the central portion are located on a same circumference.

4. The universal tool mounting apparatus according to claim 1, wherein the plurality of second channels are shorter than the plurality of first channels.

* * * * *